United States Patent [19]  [11] 4,130,548
Kochanowski  [45] Dec. 19, 1978

[54] PREPARATION OF POLYESTER CARBONATES FROM POLYANHYDRIDE ESTER INTERMEDIATES

[75] Inventor: John E. Kochanowski, Hinsdale, Mass.

[73] Assignee: General Electric, Pittsfield, Mass.

[21] Appl. No.: 844,285

[22] Filed: Oct. 21, 1977

[51] Int. Cl.$^2$ ............................................. C08G 63/62
[52] U.S. Cl. ................................... 528/197; 260/860; 528/202
[58] Field of Search ............. 260/47 XA, 860, 78.4 R, 260/49

[56] References Cited

U.S. PATENT DOCUMENTS

| 3,030,331 | 4/1962 | Goldberg | 260/42 |
| 3,169,121 | 2/1965 | Goldberg | 260/47 |
| 3,207,814 | 9/1965 | Goldberg | 260/860 |

Primary Examiner—Theodore E. Pertilla
Attorney, Agent, or Firm—Morgan, Finnegan, Pine, Foley & Lee

[57] ABSTRACT

A novel process is disclosed for the preparation of polyester carbonates containing both carboxylate and carbonate groups. The process is based on the making of a mixed polyanhydride ester of a dibasic acid which is reacted with a dihydroxy compound to form a hydroxy containing intermediate that is subsequently transformed into a polyester carbonate by means of a carbonate forming reagent.

16 Claims, No Drawings

PREPARATION OF POLYESTER CARBONATES FROM POLYANHYDRIDE ESTER INTERMEDIATES

This invention is concerned with providing a novel process for the preparation of polyester carbonates containing both carboxylate and carbonate groups. The process comprises first preparing a mixed polyanhydride ester of a dibasic acid and halogen carbonic acid ester of a polyhydroxy compound which is reacted with a dihydroxy compound to form a hydroxy containing intermediate that is subsequently transformed into a polyester carbonate by means of a carbonate forming reagent.

BACKGROUND OF THE INVENTION

The polyester carbonates and methods for their preparation are described in U.S. Pat. No. 3,030,331; U.S. Pat. No. 3,169,121 and U.S. Pat. No. 3,207,814, all of which are hereby incorporated by reference. In copending application Ser. No. 755,352, a method is disclosed for the preparation of polyester carbonates by an interfacial polymerization process.

It has now been found that the polyester carbonates can be prepared from a mixed polyanhydride ester of a dicarboxylic acid and a halogen carbonic acid ester of a polyhydroxy compound. The use of the mixed polyanhydride permits the reaction with the dihydroxy compound to be carried out in a homogeneous or heterogeneous reaction mixture.

DETAILED DESCRIPTION OF THE INVENTION

The process of the invention is directed to the preparation of a copolyester containing both carboxylate and carbonate groups. The process comprises:
(a) forming a polymeric mixed anhydride ester from a salt of a difunctional carboxylic acid and a halogen carbonic acid ester of polyhydroxy compound;
(b) contacting said polymeric mixed anhydride ester with at least one molar equivalent of a dihydroxy compound; and
(c) thereafter contacting the excess of the dihydroxy compound with a carbonate forming reagent to form the copolyester containing both carboxylate and carbonate groups.

The salts of the difunctional carboxylic acid are the alkali, alkaline earth, ammonium, primary, secondary, tertiary and quaternary ammonium salts of dicarboxylic acids.

Included within the scope of the invention are the saturated aliphatic dibasic acids derived from straight chain parafin hydrocarbons, such as oxalic, malonic, dimethyl malonic, succinic, glutaric, adipic, pimelic, suberic, azelaic and sebacic acids. Aliphatic carboxylic acids containing hetero atoms in their aliphatic chain, such as thio-diglycollic or diglycollic acid may also be used. Also useful are such unsaturated acids as maleic or fumaric.

Suitable examples of aromatic and aliphatic aromatic dicarboxylic acids which may be used are phthalic, isophthalic, terephthalic, homophthalic, o-, m-, and p-phenylenediacetic acid, the polynuclear aromatic acids such as diphenic acid and 1,4-naphthalic acid.

Other useful acids are the polymerized fatty acids as, for example, those sold under the trade name "Empol" by the Emery Company, one example of which is a linoleic acid dimer containing two carboxyl groups per molecule. Mixtures of the difunctional carboxylic acids can also be employed and where difunctional carboxylic acids are mentioned herein, mixtures of such materials are intended to be included.

The halogen carbonic acid esters of a polyhydroxy compound include the alkyl, cycloalkyl, alkylaryl, aryl and arylalkyl halogencarbonic acid esters, such as the methyl, ethyl, benzyl, phenyl, cresyl, p-tert-butylphenylchloro-and bromcarbonic acid esters or polyhalogencarbonic acid esters of organic polyhydroxy compounds such as the bischloro and bisbromocarbonic acid esters of 1,4-butanediol; 1,6-hexandiol; 1,10-decanediol; hydroquinone; 4,4'-dihydroxy-diphenyl; 4,4'-dihydroxydiphenyl-2,2-propane and tetrachloro-4,4'-dihydroxy-diphenyl-2,2-propane; trischloro-and trisbromocarbonic acid esters of trimethylolethane; trimethylolethane; trimethylolbutane.

The polyanhydride ester may be formed by contacting the salt of the difunctional carboxylic acid with an approximately equimolar amount of the halogencarbonic acid ester of the polyhydroxy compound and in an aqueous solution a suspension at a pH of 5.5 to 8.5. If desired from 0.01 to 2 mol.% based on the halogencarbonic acid ester of a polyhydroxy compound, of a primary, secondary or preferably a tertiary amine or a quaternary ammonium base or salts thereof, for example methylamine, ethylamine, butylamine, octylamine, stearylamine, benzylamine, aniline, 4-aminotoluene, α-naphthylamine, dimethylamine, diethylamine, di-n-propylamine, diisobutylamine, N-methylaniline, diphenylamine, dicyclohexylamine, trimethylamine, triethylamine, tributylamine, trioctylamine, N,N-dimethylcycohexylamine, N,N-dimethylaniline, pyridine, collidine, quinoline and triethylbenzylammonium hydroxide or their hydrochlorides may be employed. If an amine salt of a difunctional acid is employed, it will usually not be necessary to employ any additional amine as a catalyst.

The polyanhydride forming reaction may be carried out at a temperature between about $-10°$ and $+60°$ C. preferably between 20° and 30° C. The reaction period is not critical and will depend on the individual reactant and the concentration of the reactants. The polyanhydride may be recovered from the reaction mixture by the use of standard techniques such as precipitation with a non-solvent.

The polyanhydride may then be contacted with at least one molar equivalent of a dihydroxy compound.

In general, any aliphatic dihydroxy compound or glycol can be used. Included are the lower molecular weight, aliphatic dihydroxy compounds, such as ethylene glycol, propanediols; butanediols, pentanediols, hexanediols, including pinacol, heptanediols, octanediols, neopentyl glycol, aryl-alkyl glycols, such as 4,4'-dihydroxy ethyldiphenyl, styrene glycol, xylylene glycols, dihydroxy alkyl ethers of dihydric phenols such as the dihydroxy ethyl ether of Bisphenol-A, thiodiglycols and cycloaliphatic glycols such as 1,4-dihydroxycyclohexane, 2,2-bis-(4-hydroxycyclohenyl)-propane, bis-(4-hydroxycyclohenyl)-methane, among others. Among the useful higher molecular weight aliphatic dihydroxy compounds are the polyethylene glycols, polystyrene glycols, polypropylene glycols, polybutylene glycols, polythioglycols, polyaryl-alkyl ether glycols and copolymer polyether glycols, the latter typified by polyethylene glycol, polypropylene glycol copolymers sold by Wyandotte Chemical Company and known as Pluronics, etc. Included also are dihydroxy compounds such as may be derived from dibasic acids and glycols, for example, the diethyleneglycol ester of adipic acid, or the diethyleneglycol ester of sebacic acid, the dineopentyl glycol ester of adipic acid or terephthalic acid, etc. Further glycols useful in connection with the invention are silanediols such as diphenylsilanediol, dimethylsilanediol, dimethylsilanediol dimer, methylphenylsilanediol, ethylphenylsilanediol, etc. Tertiary amino-glycols are also useful, including among others N-phenyldiethanolamine, N-methyldiethanolamine, N-propyldiethanolamine and N-phenyldi-n-propanolamine. Any polymeric aliphatic material having hydroxyl end groups is useful, including polyethers, polyesters, polyurethanes, polyacetals and polysiloxanes. Furthermore, polymers terminated with —COCl groups, for example, polyesters prepared drom dibasic acid chlorides, are useful, as are polymers having —O-COCl end groups, such as polycarbonates prepared from phosgene. The aliphatic dihydroxy compounds or glycols can typically be represented by the formula

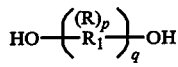
I where R is a monovalent hydrocarbon radical, for example, alkyl radicals (e.g., methyl, ethyl, propyl, isopropyl, butyl, decyl, etc.), aryl radicals (e.g., phenyl, naphthyl, biphenyl, tolyl, xylyl, etc.), aralkyl radicals (e.g., benzyl, ethylphenyl, etc.), cycloaliphatic radicals (e.g., cyclopentyl, cyclohexyl, etc.) as well as monovalent hydrocarbon radicals containing inert substituents thereon, such as halogen (chlorine, bromine, fluorine, etc.). It will be understood that where more than one R is used, they may be alike or different, $R_1$ can be selected from the group consisting of alkylene and alkylidene residues such as methylene, ethylene, propylene, propylidene, isopropylidene, butylene, butylidene, isobutylidene, amylene, isoamylene, amylidene, isoamylidene, etc. $R_1$ can also be a silane radical or can be polyalkoxy such as polyethoxy, polypropoxy, polythioethoxy, polybutoxy, polyphenylethoxy, polydiphenylsiloxy, polymethylphenylsiloxy, etc. $R_1$ can also consist of two or more alkylene or alkylidene groups as above separated by the residue of an aromatic nucleus, a tertiary amino radical, an ether radical, a carbonyl radical, a silane radical, or by a sulfur containing radical such as sulfide, sulfoxide, sulfone, etc. $R_1$ may also be a glycol dibasic acid ester residue derived from, for example, dibasic acids such as adipic, azelaic, sebacic, isophthalic, terephthalic, and glycols such as have been disclosed above. Other groupings which can be represented by $R_1$ will occur to those skilled in the art. The ester residue can be polymeric or monomeric. The subscript p is a whole number including zero to a maximum determined by the number of replaceable hydrogens on $R_1$. The subscript q is an integer which may be varied as desired and $R_1$, where q is more than 1, may be like or different radicals. It is understood, of course, that mixtures of different dihydroxy compounds glycols may be used and where glycol is mentioned, such mixtures are considered to be included.

Any dihydric phenol compound is useful in the practice of the invention. The dihydric phenol compounds used in connection with the invention can typically be represented by the general formula

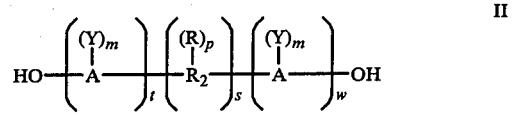
II where R is a monovalent hydrocarbon radical as above, $R_2$ is selected from the group consisting of an alkylene and alkylidene residue in the same sense as $R_1$ or an ether, a sulfur-containing linkage such as sulfide, sulfoxide, sulfone, a carbonyl, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silene radical or by a sulfur-containing radical such as sulfide, sulfoxide, sulfone, etc. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, m is a whole number including zero to a maximum equivalent to the number of replaceable nuclear hydrogens substituted on the aromatic hydrocarbon residue, p is a whole number including zero to a maximum determined by the number of replaceable hydrogens on $R_2$, s ranges from zero to 1, t and u are whole numbers including zero. When s is zero, however, either t or u may be zero and not both.

In the dihydric phenol compound, the substituents Y may be the same or different. When p is greater than one, the R's may be alike or different. Monovalent hydrocarbon radicals designated by R can be the same as those in reference to the compound of Formula I above, as may be those represented by $R_1$. Among the substituents represented by Y are halogen (e.g., chlorine, bromine, fluorine, etc.) or oxy radicals of the formula OW, where W is a monovalent hydrocarbon radical similar to R. Other inert substituents such as a nitro group can be represented by Y. Where s is zero in Formula II, the aromatic nuclei are directly joined with no intervening alkylene or alkylidene or other bridge. The positions of the hydroxyl groups and Y on the aromatic nuclear residues A can be varied in the ortho, meta or para positions and the groupings can be in a vicinal, asymmetrical or symmetrical relationship, where two or more of the nuclearly bonded hydrogens of the aromatic hydrocarbon residue are substituted with Y and the hydroxyl groups. Examples of dihydric phenol compounds that may be employed in this invention include, 2,2-bis-(4-hydroxyphenyl)-propane (Bisphenol-A); 2,4'-dihydroxydiphenyl-methane; bis-(2-hydroxyphenyl)-methane; bis-(4-hydroxyphenyl-methane; bis-(4-hydroxy-5-nitrophenyl)-methane; bis-(4,-hydroxy-2,6-dimethyl-3-methoxyphenyl-methane; 1,1-bis-(4-hydroxyphenyl)-ethane; 1-2-bis-(4-hydroxyphenyl)-ethane; 1,1-bis-(4-hydroxy-2-chlorophenyl)-ethane; 1,1-bis(2,5-dimethyl-4-hydroxyphenyl)-ethane; 1,3-bis-(3,-methyl-4-hydroxyphenyl)-propane; 2,2-bis-(3-phenyl-4-hydroxyphenyl)-propane; 2,2-bis-(3-isopropyl-4-hydroxyphenyl)-propane; 2,2-bis-(4-hydroxynaphthyl)-propane; 2,2-bis-(4-hydroxyphenyl)-pentane; 3,3-bis-(4-hydroxyphenyl)-pentane; 2,2-bis-(4-hydroxyphenyl)-heptane; bis (4-hydroxyphenyl)-phenyl methane; bis-(4-hydroxyphenyl)-cyclohexyl methane; 1,2-bis-(4- hydroxyphenyl)-1,2-bis-(phenyl)-ethane; 2,2-bis-(4-hydroxyphenyl)-1,3-bis-phenyl)-propane; 2,2-bis-(4-hydroxyphenyl)-1-phenyl propane; and the like. Also included are dihydroxybenzenes typified by hydroquinone and resorcinol, dihydroxydiphenyls such as 4,4'-dihydroxydiphenyl; 2,2'-dihydroxydiphenyl; 2,4'-dihydroxydiphenyl; dihydroxynaphthalenes such as 2,6-dihydroxynaphthalene, etc. Dihydroxy aryl sulfones such as those set forth in application Ser. No. 613,817, filed Oct. 4, 1956, assigned to the same assignee as this invention are also useful, e.g., bis-(p-hydroxyphenyl)-sulfone; 2,4'-dihydroxydiphenyl sulfone, 5'-chloro-2,4'-dihydroxydiphenyl sulfone, 5'-chloro-2',4-dihydroxydiphenyl sulfone; 3'-chloro-4,4'-dihydroxydiphenyl sulfone; bis-(4-hydroxyphenyl diphenyl disulfone etc. The preparation of these and other useful sulfones is described in U.S. Pat. No. 2,288,282—Huissman, Polysulfones as well as substituted sulfones using halogen, nitrogen, alkyl radicals, etc. are also useful. Dihydroxy aromatic ethers such as those set forth in application Ser. No. 598,768, filed July 19, 1955, now U.S. Pat. No. 3,148,172 assigned to the same assignee as this invention are also useful. Methods of preparing such materials are found in Chemical Reviews, 38, 414–417 (1946), and U.S. Pat. No. 2,739,171—Linn. Exemplary of such dihydroxy aromatic ethers are p,p'-dihydroxydiphenyl ether; p,p'-dihydroxytriphenyl ether; the 4,3'-, 4,2'-, 4,1'-, 2,2'-, 2,3'-, etc. dihydroxydiphenyl ethers; 4,4'-dihydroxy-2,6-dimethyldiphenyl; ether; 4,4'-dihydroxy-2,5-dimethyldiphenyl ether; 4,4' dihydroxy-3,3'-di-isobutyldiphenyl ether; 4,4'-dihydroxy-3,3'-diisopropyldiphenyl ether; 4,4'-dihydroxy, 3,2'-dinitrodiphenyl ether; 4,4'-dihydroxy-3,3'-dichlorodiphenyl ether; 4,4'-dihydroxy3'-difluorodiphenyl ether; 4,4'-dihydroxy-2,3'-dibromodiphenyl ether; 4,4'-dihydroxydinaphthyl ether; 4,4'-dihydroxy-3,3'-dichlorodinaphthyl ether; 2,4-dihydroxytetraphenyl ether; 4,4'-dihydroxypentaphenyl ether; 4,4'-dihydroxy-2,6-dimethoxydiphenyl ether; 4,4'-dihydroxy-2,4-diethoxydiphenyl ether, etc. Mixtures of the dihydric phenols can also be employed and where dihydric phenol is mentioned herein, mixtures of such materials are considered to be included.

The dihydroxy compound may be contacted with the polyanhydride ester in a homogenous or heterogenous dispersion in an appropriate liquid media. Aprotic, organic solvents such as methylene chloride are preferably employed. After the dihydroxy compound reacts with the polyanhydride ester compound, the resulting product is reacted with a carbonate forming reagent to form the copolyester having carboxylate and carbonate groups. The reaction to form the carbonate groups may be carried out with a carbonyl halide such as phosgene or a carbonate ester such as diphenyl carbonate or a bishaloformate such as bisphenol-A bischloroformate. Phosgene is the preferred carbonate forming reagent. The reaction may be carried out at a temperature between −10° and 300° C., depending on the carbonate forming reagent. If phosgene or a bischloroformate is employed, temperatures between 10° and 50° C. are preferred, if a interfacial polymerization is employed, a pH of 9.0–11.5 would be preferred.

The copolyester may be recovered from the reaction mixture by precipitation with a non-solvent or other appropriate methods.

DESCRIPTION OF THE PREFERRED EMBODIMENTS

The following example illustrates the process of the invention. It is merely illustrative and is not to be construed to limit the invention in any manner whatsoever.

EXAMPLE

A mixed anhydride ester of isophthalic acid and bisphenol-A bischloroformate was made by adding a solution of 77.8 g of bisphenol-A-bischloroformate in 200 ml methylene dichloride dropwise over a period of thirty minutes to a solution of 33.2 g of isophthalic acid, 0.5 g benzoic acid, 160 g 10% aqueous NaOH, 70 g sodium bicarbonate, 300 ml methylenedichloride and 0.5 ml triethylamine. The reaction mixture was allowed to stir for three hours. The organic layer was diluted with 750 ml methylene dichloride, washed twice with HCl (pH 1.2), once with 0.1 N sodium bicarbonate and twice with water. The organic phase was dried over sodium sulfate. The polyanhydride ester was precipitated into hexane.

To a solution of 55 g of the above polyanhydride ester in 350 ml methylene dichloride was added 63.5 g bisphenol-A, 1.12 g phenol, 150 ml water and 1.2 ml triethylamine. The pH of the reaction mixture was adjusted to 11 by the addition of 25% aqueous NaOH. After stirring for 20 minutes, phosgene was added to pH 11 until the sample thickened. Upon isolation by precipitation into methanol a polyestercarbonate was obtained. Analysis showed: Intrinsic Viscosity 0.37 dl/gm as measured in chloroform at 25° C.; Infrared spectrum: $\lambda$ max 1772 cm$^{-1}$, 1742 cm$^{-1}$.

Although the example shows various modifications of the present invention, other variations are possible in light of the above teachings. It is, therefore, to be understood that changes may be made in the particular embodiments of the invention described which are within the full intended scope of the invention as defined by the appended claims.

I claim:

1. A process for the preparation of a copolyester containing both carboxylate and carbonate groups, said process comprising:
   (a) forming a polymeric mixed anhydride ester from by contacting a salt of a di carboxylic acid with a halogen acid ester of a polyhydroxy compound;
   (b) contacting said polymeric mixed anhydride ester with at least one molar equivalent of a dihydroxy compound; and
   (c) thereafter contacting the excess of the dihydroxy compound with a carbonate forming reagent to form the copolyester containing both carboxylate and carbonate groups.

2. The process of claim 1 wherein the carbonate forming reagent is phosgene.

3. The process of claim 1 wherein a minor amount of a branching agent having at least three ester forming groups is added to the reaction.

4. A process for the preparation of copolyesters containing both carboxylate and carbonate groups, said process comprising:
   (a) forming a polymeric mixed anhydride ester by contacting an alkali metal salt of a di carboxylic acid with a halogen carbonic acid ester of a polyhydroxy compound in the presence of an amine catalyst;

(b) contacting said polymeric mixed anhydride ester with at least one molar equivalent of a dihydroxy compound; and
(c) thereafter contacting the excess of the dihydroxy compound with a carbonyl halide to form the copolyester containing both carboxylate and carbonate groups.

5. The process of claim 4 wherein the di carboxylic acid is adipic acid.

6. The process of claim 4 wherein the di carboxylic acid is isophthalic acid.

7. The process of claim 4 wherein the di carboxylic acid is terephthalic acid.

8. The process of claim 4 wherein the di carboxylic acid is azelaic acid.

9. The process of claim 4 wherein the di carboxylic acid is sebacic acid.

10. The process of claim 4 wherein the dihydroxy compound is 2,2-bis(4-hydroxyphenyl) propane.

11. The process of claim 4 wherein the dihydroxy compound is 4,4'-dihydroxydiphenyl ether.

12. The process of claim 4 wherein the dihydroxy compound is 4,4'-dihydroxydiphenyl sulfone.

13. The process of claim 4 wherein the dihydroxy compound is tetrabromobisphenol-A.

14. The process of claim 7 wherein the dihydroxy compound is 2,2-bis(4-hydroxyphenyl) propane.

15. A process for the preparation of a copolyester containing both carboxylic acid and carbonate groups, said process comprising:
(a) forming a polymeric mixed anhydride ester by contacting isophthalic acid in the presence of a tertiary amine and sodium hydroxide;
(b) contacting the polymeric mixed anhydride ester of step (a) with a molar excess of bisphenol-A in the presence of a tertiary amine and in an alkaline medium;
(c) contacting the product of step (b) with phosgene to form the copolyester containing both carboxylate and carbonate groups.

16. The process of claim 15 wherein step (b) is carried out in the presence of triethylamine.

* * * * *